(12) United States Patent
Kasazumi et al.

(10) Patent No.: US 9,927,610 B2
(45) Date of Patent: Mar. 27, 2018

(54) DISPLAY DEVICE, AND DISPLAY METHOD THEREFOR

(71) Applicant: Panasonic Intellectual Property Management Co., Ltd., Osaka (JP)

(72) Inventors: Kenichi Kasazumi, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/308,357

(22) PCT Filed: May 8, 2015

(86) PCT No.: PCT/JP2015/002334
§ 371 (c)(1),
(2) Date: Nov. 1, 2016

(87) PCT Pub. No.: WO2015/174048
PCT Pub. Date: Nov. 19, 2015

(65) Prior Publication Data
US 2017/0059863 A1    Mar. 2, 2017

(30) Foreign Application Priority Data

May 12, 2014    (JP) .................................. 2014-098925

(51) Int. Cl.
*G02B 27/01*    (2006.01)
*G03B 21/28*    (2006.01)
(Continued)

(52) U.S. Cl.
CPC .......... *G02B 27/0101* (2013.01); *B60K 35/00* (2013.01); *G02B 5/30* (2013.01);
(Continued)

(58) Field of Classification Search
CPC ................ G02B 27/01; G02B 27/0103; G02B 2027/0114; G02B 2027/013; G02B 2027/0136; G03B 21/28; G03B 21/14
(Continued)

(56) References Cited

U.S. PATENT DOCUMENTS

| | | | |
|---|---|---|---|
| 4,987,410 A * | 1/1991 | Berman ............... | G02B 5/3016 345/9 |
| 2007/0268541 A1* | 11/2007 | Fujita ....................... | G02F 1/29 353/50 |

(Continued)

FOREIGN PATENT DOCUMENTS

EP    3133437 A1    2/2017
JP    2-003007    1/1990
(Continued)

OTHER PUBLICATIONS

International Search Report of PCT application No. PCT/JP2015/002334 dated Jul. 14, 2015.
(Continued)

*Primary Examiner* — Ryan Howard
(74) *Attorney, Agent, or Firm* — Greenblum & Bernstein, P.L.C.

(57) ABSTRACT

This display device is provided with a display unit, a beam splitter, and a first mirror. The display unit emits a first image and a second image. The beam splitter has, incident thereon, the first image and the second image which are emitted from the display unit. The beam splitter transmits the incident first image and reflects the incident second image to project the first image and the second image on a display medium. The first mirror has, incident thereon, the first image which has been transmitted through the beam splitter. The first mirror reflects the incident first image to project the first image on the display medium.

11 Claims, 6 Drawing Sheets

(51) Int. Cl.

| | |
|---|---|
| *B60K 35/00* | (2006.01) |
| *G09G 3/20* | (2006.01) |
| *G09G 5/00* | (2006.01) |
| *G02B 5/32* | (2006.01) |
| *G02B 27/14* | (2006.01) |
| *G02B 27/28* | (2006.01) |
| *G02B 5/30* | (2006.01) |
| *G09G 3/00* | (2006.01) |
| *G09B 9/32* | (2006.01) |
| *G02F 1/1335* | (2006.01) |
| *G02F 1/1347* | (2006.01) |

(52) U.S. Cl.
CPC ............ *G02B 5/3016* (2013.01); *G02B 5/32* (2013.01); *G02B 27/141* (2013.01); *G02B 27/286* (2013.01); *G03B 21/28* (2013.01); *G09B 9/326* (2013.01); *G09G 3/002* (2013.01); *G09G 3/20* (2013.01); *G09G 5/00* (2013.01); *B60K 2350/2021* (2013.01); *B60K 2350/2026* (2013.01); *B60K 2350/2052* (2013.01); *B60K 2350/2056* (2013.01); *G02B 2027/015* (2013.01); *G02B 2027/0114* (2013.01); *G02B 2027/0118* (2013.01); *G02F 1/13471* (2013.01); *G02F 1/133528* (2013.01)

(58) Field of Classification Search
USPC .................. 359/13, 630, 631, 632; 353/7, 8
See application file for complete search history.

(56) References Cited

U.S. PATENT DOCUMENTS

| | | | |
|---|---|---|---|
| 2008/0084545 A1* | 4/2008 | Chen .................. | G03B 21/28 353/33 |
| 2010/0231868 A1* | 9/2010 | Chen .................. | G03B 21/28 353/82 |
| 2011/0267700 A1 | 11/2011 | Schliep et al. | |
| 2012/0200476 A1 | 8/2012 | Kanamori et al. | |
| 2014/0104580 A1 | 4/2014 | Tsai et al. | |

FOREIGN PATENT DOCUMENTS

| | | |
|---|---|---|
| JP | 2005-338689 | 12/2005 |
| JP | 2010-276689 | 12/2010 |
| JP | 2012-507426 | 3/2012 |

OTHER PUBLICATIONS

The Extended European Search Report dated Aug. 29, 2017 for the related European Patent Application No. 15792745.5.

* cited by examiner

DISPLAY DEVICE, AND DISPLAY METHOD THEREFOR

CROSS-REFERENCE TO RELATED APPLICATIONS

This application is a U.S. national stage application of the PCT International Application No. PCT/JP2015/002334 filed on May 8, 2015, which claims the benefit of foreign priority of Japanese patent application 2014-098925 filed on May 12, 2014, the contents all of which are incorporated herein by reference.

FIELD OF THE INVENTION

The present disclosure relates to a display device, and in particular, a display device for vehicle.

Description of the Related Art

As a display device for a vehicle, a head-up display (HUD) is known (for example, refer to PTL 1). For example, an object for indicating a state of a vehicle, an object for navigating the vehicle, or the like is displayed in the head-up display. A state of the vehicle is, for example, speed information.

CITATION LIST

Patent Literature

PTL 1: PCT Japanese Translation Patent Publication No. 2012-507426

SUMMARY OF THE INVENTION

The present disclosure provides a display device which enlarges a display image and can suppress an enlargement of a displacement space of an optical system.

A display device according to an aspect of the present disclosure includes a display, a beam splitter, and a first mirror. The display emits a first image and a second image. The first image and the second image emitted from the display are incident to the beam splitter. The beam splitter projects the image to a display medium by transmitting the incident first image and reflecting the incident second image. The first image which has passed through the beam splitter is incident to the first mirror. The first mirror projects the incident first image to the display medium by reflecting the incident first image.

It should be noted that general and specific aspects disclosed above may be implemented using a system, a method, an integrated circuit, a computer program, or a computer-readable recording medium such as a CD-ROM. In addition, general or specific aspects of the above may be realized by an arbitrary combination of a system, a method, an integrated circuit, a computer program, and a recording medium.

The display device of the present disclosure enlarges a display image and can suppress an enlargement of a displacement space of an optical system.

DETAILED DESCRIPTION OF THE PREFERRED EMBODIMENTS

Figure 8:
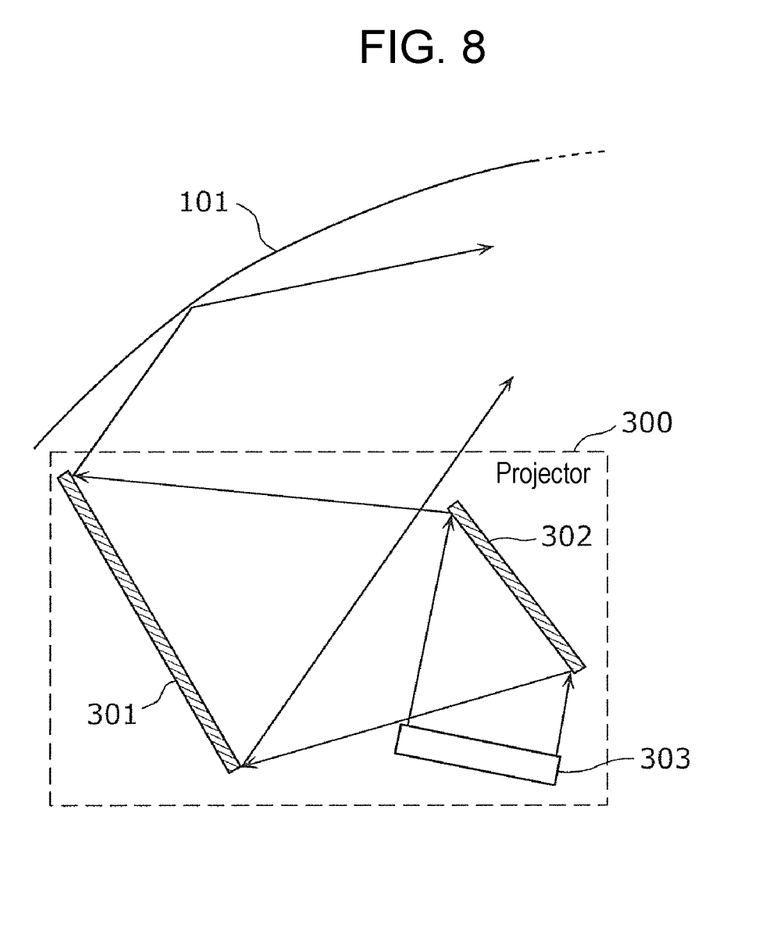
FIG. 8 is a schematic diagram illustrating an example of a projector of a head-up display.

First, underlying knowledge forming the basis of the present disclosure will be described using FIG. 8. FIG. 8 is a schematic diagram illustrating a projector of a head-up display which is disclosed in PTL 1.

In FIG. 8, projector 300 which projects an image and windshield glass 101 that is a display medium to which an image from projector 300 is projected are illustrated. The image to be projected by projector 300 may be light configuring an image. In addition, windshield glass 101 may be a front glass, for example.

As illustrated in FIG. 8, projector 300 includes first mirror 301, second mirror 302, and display 303.

Display 303 illustrated in FIG. 8 is an image generator which generates an image to be projected from projector 300. Display 303 is configured by a liquid crystal panel or the like, for example.

Second mirror 302 illustrated in FIG. 8 is a mirror configuring an optical system of projector 300 and reflects the image incident from display 303 toward first mirror 301.

First mirror 301 illustrated in FIG. 8 is a mirror configuring an optical system of projector 300 and reflects the image incident from second mirror 302 toward windshield glass 101.

Here, in a case where a user uses the head-up display, in order to improve visibility of a display image to be recognized and increase information amount in the display image, it is preferable to increase a dimension of the display image. The display image to be recognized is a virtual image, for example.

Here, in order to enlarge the dimension of the display image in a horizontal direction of the display image, it is required to enlarge the dimension of an optical system of projector 300 illustrated in FIG. 8 in the horizontal direction. The horizontal direction of the display image is a direction perpendicular to a sheet surface of FIG. 8.

In addition, in a case of enlarging the dimension of the display image in a vertical direction, as described below, it is required to enlarge the dimension of the optical system further than the case of enlarging the dimension of the display image in the horizontal direction. The vertical direction is a top and bottom direction of FIG. 8.

First, in order to enlarge the dimension of the display image in the vertical direction, in the same manner of the case of the horizontal direction, it is required to enlarge the dimension of the optical system of projector 300 in the vertical direction. Furthermore, in order to incident the image which is enlarged on enlarged first mirror 301, it is required to keep second mirror 302 away from first mirror 301. Accordingly, in order to enlarge the dimension of the display image in the vertical direction, it is required to enlarge the optical system in a longitudinal direction of a vehicle as well as in the vertical direction. The longitudinal direction of the vehicle is a horizontal direction of FIG. 8.

Therefore, in order to store the optical system to a limited space in the dashboard of the vehicle, the enlargement of the dimension in the vertical direction of the display image is further limited than the enlargement of the dimension in the horizontal direction.

Hereinafter, the exemplary embodiment will be described in detail while referring to drawings.

It is to be noted that each of the exemplary embodiments described below shows a general example or specific example of the present disclosure. The numerical values, shapes, materials, structural elements, the disposition and connection form of the structural elements, steps, the processing order of the steps or the like, shown in the following exemplary embodiments are mere examples and do not restrict the scope of the present disclosure. Furthermore, among the structural elements in the following exemplary embodiments, structural elements not recited in the independent claims each indicating the top concept are described as arbitrary structural elements.

(Exemplary Embodiment 1)

Hereinafter, a display device according to Exemplary Embodiment 1 will be described with reference to FIGS. 1 to 4.

[1-1. Configuration of Display Device]

A configuration of the display device according to the present exemplary embodiment will be described using FIGS. 1 and 2.

Figure 1:
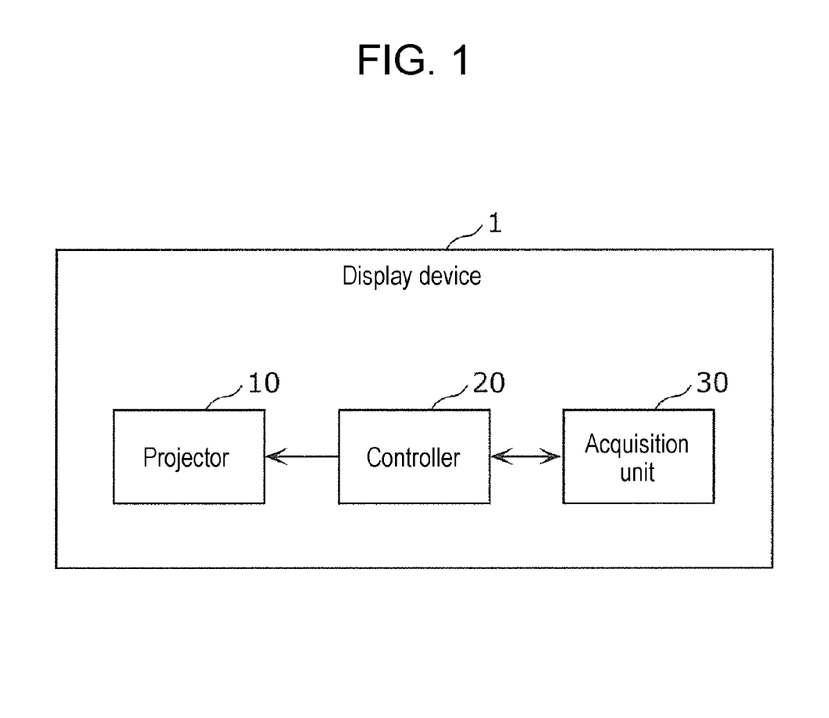
FIG. 1 is a block diagram illustrating a functional configuration of a display device according to Exemplary Embodiment 1.

FIG. 1 is a block diagram illustrating a functional configuration of a display device according to the present exemplary embodiment. FIG. 2 is a schematic diagram illustrating a disposition example of the display device in a vehicle of the present exemplary embodiment.

As illustrated in FIG. 1, display device 1 includes projector 10, controller 20, and acquisition unit 30.

Figure 2:
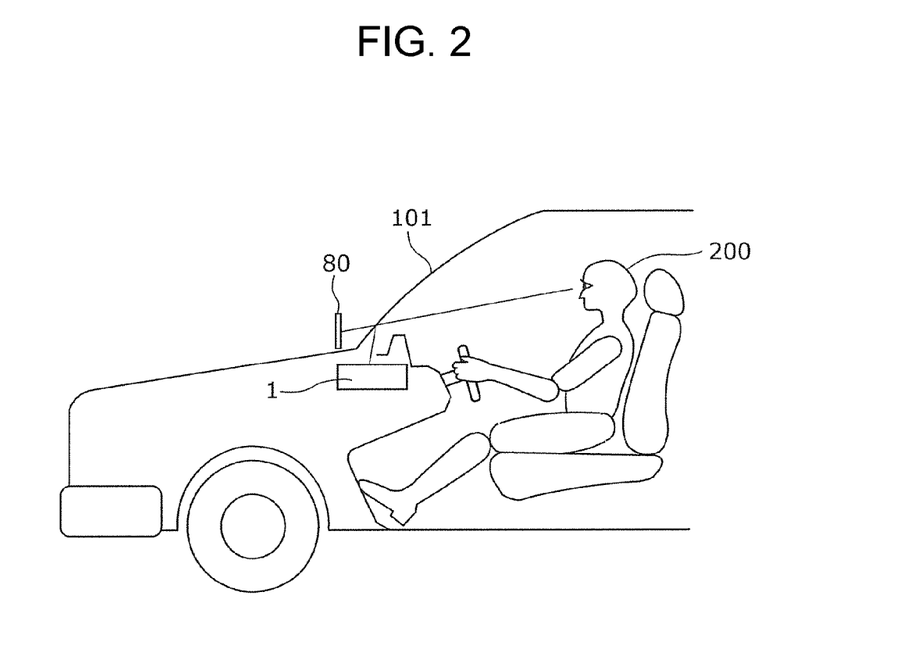
FIG. 2 is a schematic diagram illustrating a disposition example of the display device in a vehicle according to Exemplary Embodiment 1.

Display device 1 illustrated in FIG. 1 is a so-called head-up display and is provided in a vehicle interior as illustrated in FIG. 2. Display device 1 projects an image to windshield glass 101 and causes user 200 to visually recognize the reflected image in windshield glass 101.

Projector 10 illustrated in FIGS. 1 and 2 is an image projection device which can project an image. Projector 10 is the image projection device which has an optical system therein and is provided in the inside the dashboard of the vehicle as illustrated in FIG. 2. A detailed configuration of the inner portion of projector 10 will be described later.

Projector 10 projects light toward windshield glass 101 that is a display medium with translucency and is capable of forming an image to position 80 using the reflection in windshield glass 101. The image formed is a virtual image, for example.

Acquisition unit 30 illustrated in FIG. 1 acquires information relating to the vehicle from the vehicle. The information relating to the vehicle is speed information or the like, specifically. Acquisition unit 30 may acquire the information from a device different from display device 1 such as a smartphone, a car navigation device provided in a vehicle, or the like. In addition, in order to acquire the information by acquisition unit 30, a communication network such as a wired or wireless communication network may be used. The communication network may be a communication interface.

Controller 20 illustrated in FIG. 1 is a processor for adjusting the image to be projected to projector 10 in accordance with the information acquired by acquisition unit 30. For example, controller 20 projects an image including an arrow for a navigation, an image including a speedometer, or the like based on the information acquired by acquisition unit 30.

Specifically, controller 20 is a processor. Controller 20 may be configured by only hardware and may be implemented by a combination of the hardware and the software. For example, controller 20 can be implemented by a microcomputer or the like.

[1-2. Configuration of Projector]

Figure 3:
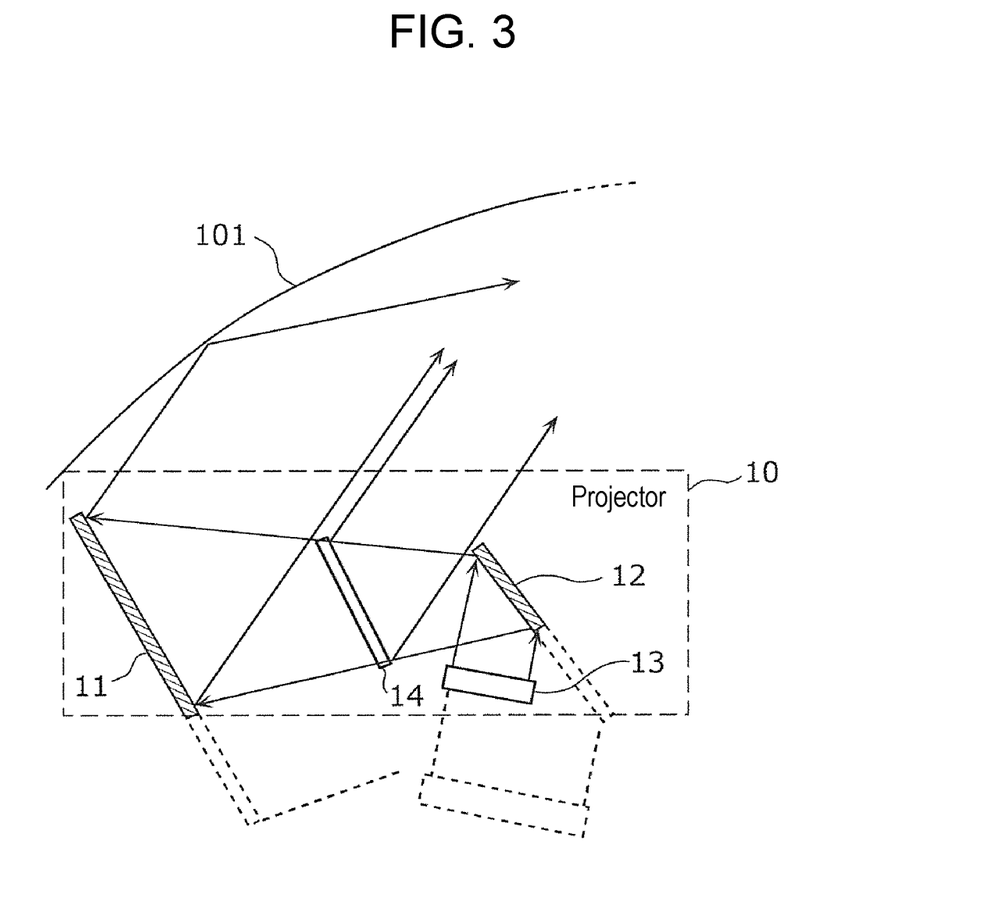
FIG. 3 is a schematic diagram illustrating an internal configuration of a projector according to Exemplary Embodiment 1.

Next, a configuration of projector 10 of display device 1 according to the present exemplary embodiment will be described. FIG. 3 is a schematic diagram illustrating an internal configuration of projector 10 according to the present exemplary embodiment.

In FIG. 3, projector 10 which projects an image and windshield glass 101 that is a display medium to which an image from projector 10 is projected are illustrated. The image to be projected by projector 10 may be light configuring an image.

As illustrated in FIG. 3, projector 10 includes first mirror 11, second mirror 12, display 13, and beam splitter 14.

Display 13 illustrated in FIG. 3 is an image generator which generates an image to be projected from projector 10. Display 13 is configured by a liquid crystal panel or the like, for example.

In the present exemplary embodiment, display 13 alternately emits a first image to be reflected to first mirror 11 and a second image to be reflected to beam splitter 14. The first image and the second image may be light configuring the image.

Second mirror 12 illustrated in FIG. 3 is a mirror configuring an optical system of projector 10 and reflects the image incident from display 13 toward beam splitter 14. Second mirror 12 may be a plane mirror and may have a curvature radius or a curved shape in accordance with an optical magnification, a divergence angle of the light configuring the image emitted from display 13, a shape of the other optical element of projector 10, or the like. As a material configuring a reflection surface of second mirror 12, an arbitrary material which can reflect the image incident from display 13 can be used.

Beam splitter 14 illustrated in FIG. 3 is an optical element configuring the optical system of projector 10 and transmits the first image among the images incident from second mirror 12 and reflects the second image toward windshield glass 101. In the present exemplary embodiment, beam splitter 14 uses an optical switch which is capable of switching the transmission and the reflection of the image. Here, as the optical switch, for example, a switchable hologram which is capable of switching the transmission and the reflection by an applied voltage can be used. In addition, the reflectance and the transmittance of beam splitter 14 can be switched at a timing at which the first image is transmitted and the second image is reflected.

First mirror 11 illustrated in FIG. 3 is a mirror configuring an optical system of projector 10, allows the image which has passed through beam splitter 14 to incident, and reflects the incident image toward windshield glass 101. First mirror 11 may be a plane mirror and may be a concave mirror. In addition, in a case where first mirror 11 is set to the concave mirror, as beam splitter 14, an element which has the light-converging ability with respect to the reflected light and does not have the light-converging ability with respect to the transmitted light may be used. As a material configuring a reflection surface of first mirror 11, an arbitrary material which can reflects the image to be incident from display 13 may be adopted.

[1-3. Display Method of Display Device]

Figure 4:
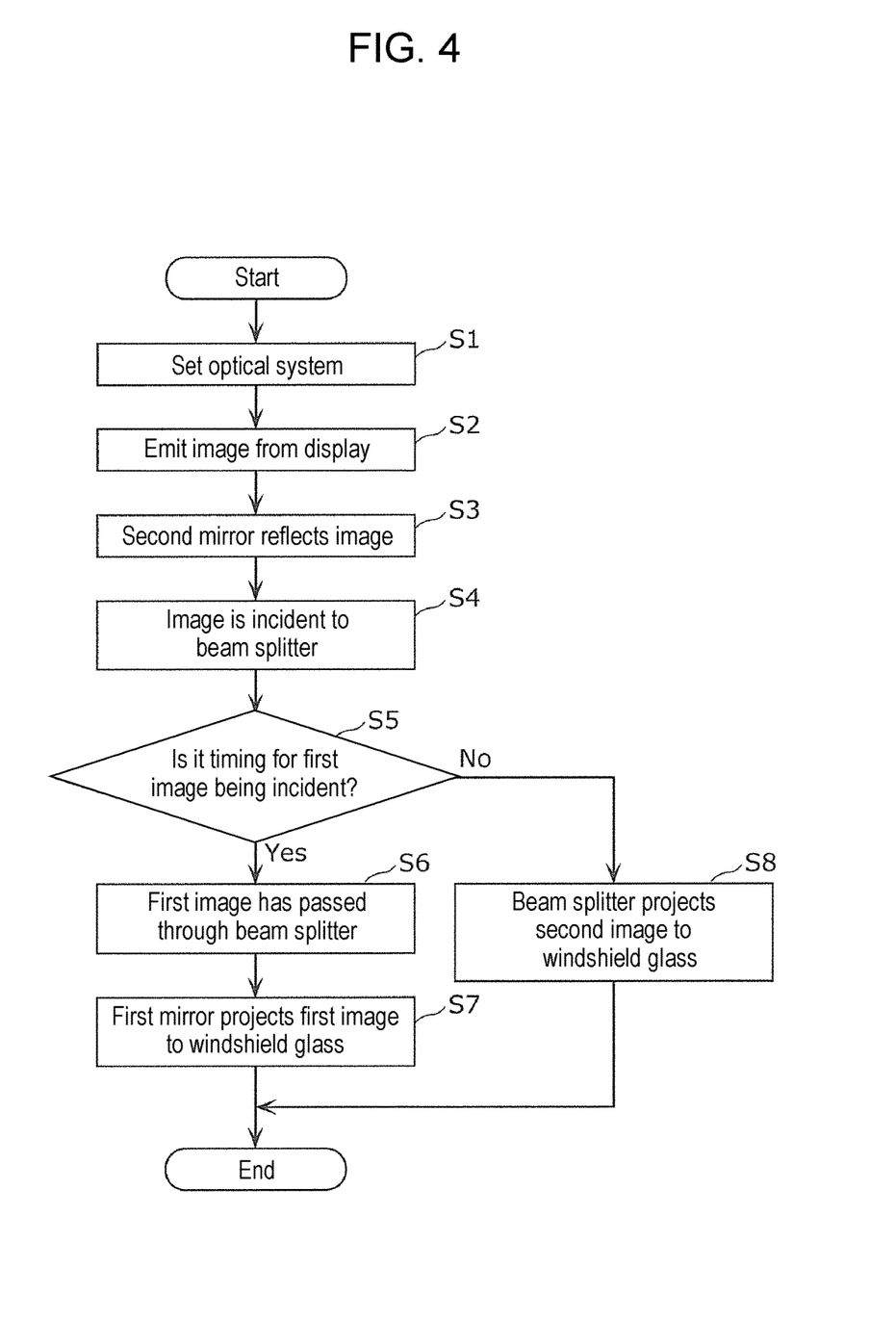
FIG. 4 is a flow chart illustrating an outline of an operation of the display device according to Exemplary Embodiment 1.

Next, a display method in display device 1 described above will be described using FIG. 4. FIG. 4 is a flow chart illustrating an outline of an operation of display device 1.

First, the optical system of projector 10 is set on a predetermined position (S1). Here, first mirror 11, second mirror 12, and beam splitter 14 are included in the optical system.

Next, image information to be displayed is output from controller 20 to display 13 and an image is emitted from display 13 toward second mirror 12 based on the image information (S2). Here, in the image information, information for generating the first image and the second image is included, and in the image emitted by display 13, the first image and the second image are included. In addition, in the present exemplary embodiment, display 13 alternatively emits the first image and the second image at the different timings.

Next, second mirror 12 reflects the image incident from display 13 toward beam splitter 14 (S3). The image is incident to beam splitter 14 (S4).

When the image is incident to beam splitter 14, if it is a timing when the first image is incident (Yes in S5), beam splitter 14, of which the transmittance is increased by controller 20, causes the first image to pass therethrough (S6). The first image which has passed through beam splitter 14 is incident to first mirror 11 and the incident first image is projected to windshield glass 101 by being reflected by first mirror 11 (S7). On the other hand, if it is not a timing when the first image is incident to beam splitter 14 (No in S5), beam splitter 14, of which the reflectance is increased by controller 20, reflects the second image to windshield glass 101. Therefore, the second image is projected to windshield glass 101 (S8).

As described above, in the present exemplary embodiment, the image emitted from display 13 is separated into the first image and the second image and the images are projected on windshield glass 101 from first mirror 11 and beam splitter 14, respectively. Accordingly, by projecting the first image and the second image to the different regions on windshield glass 101, the dimension of the display image to be visually recognized by user 200 in the vertical direction can be enlarged. Furthermore, in the present exemplary embodiment, since light paths of the first image and the second image are partially shared, the enlargement of the optical system can be suppressed.

In the present exemplary embodiment, the first image and the second image may be alternatively switched at a high speed by display 13. Therefore, the eyes of user 200 can recognize the first image and the second image such that they are displayed at the same time.

In the present exemplary embodiment, a configuration in which second mirror 12 is used. However, second mirror 12 may not be used. That is, the image emitted from display 13 may directly incident to beam splitter 14. Therefore, the optical system can be simplified.

(Exemplary Embodiment 2)

Next, a display device according to Exemplary Embodiment 2 will be described. In Exemplary Embodiment 1, as a configuration in which the first image and the second image are incident to the beam splitter at the different timings, the first image and the second image are separated. Whereas, in the present exemplary embodiment, by using the first image and the second image which have the different spectra, the first image and the second image are separated. Since the present exemplary embodiment is mainly different from Exemplary Embodiment 1 in terms of the configuration of the projector, the projector will be described below and the other configuration will not be described.

[2-1. Configuration of Projector]

Figure 5:
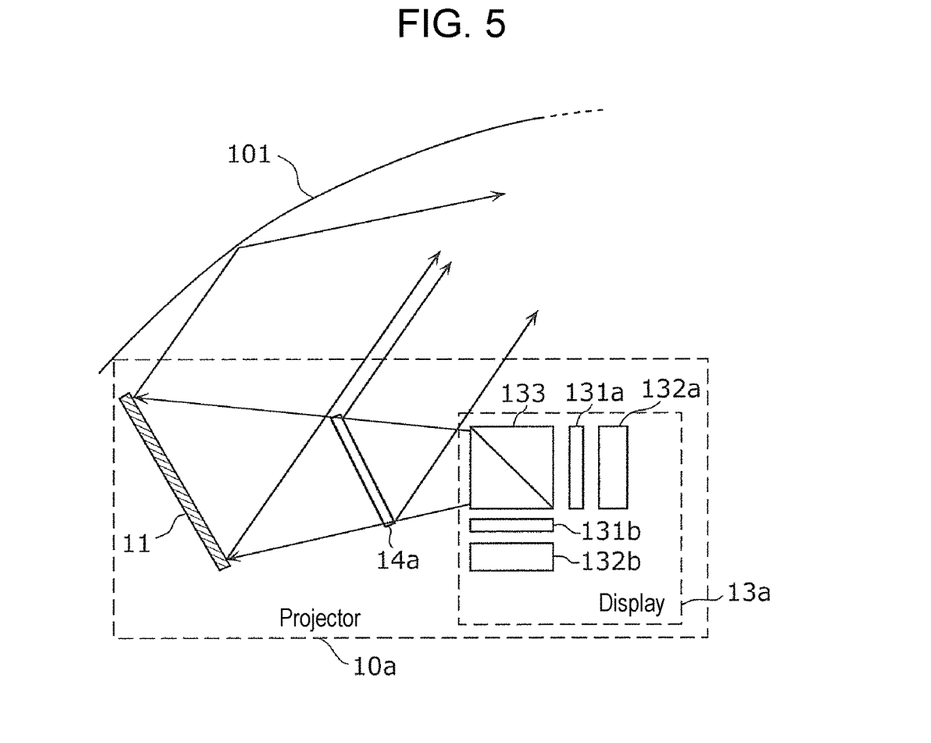
FIG. 5 is a schematic diagram illustrating an internal configuration of a projector according to Exemplary Embodiment 2.

A configuration of a projector according to the present exemplary embodiment will be described using FIGS. 5 and 6. FIG. 5 is a schematic diagram illustrating an internal configuration of projector 10*a* according to the present exemplary embodiment.

As illustrated in FIG. 5, projector 10*a* includes first mirror 11, display 13*a*, and beam splitter 14*a*.

Display 13*a* illustrated in FIG. 5 is an image generator which generates an image to be projected from projector 10*a*. As illustrated in FIG. 5, display 13*a* includes first display element 131*a* and second display element 131*b*, first light source 132*a* and second light source 132*b*, and multiplexer 133.

Each of first light source 132*a* and second light source 132*b* of display 13*a* is a light source which outputs light to first display element 131*a* and second display element 131*b*. In the present exemplary embodiment, first light source 132*a* and second light source 132*b* have the different spectra. First light source 132*a* is a light source which outputs blue light of wavelength B1, green light of wavelength G1, and red light of wavelength R1, mainly. In addition, second light source 132*b* is a light source which outputs blue light of wavelength B2 ($\neq$B1), green light of wavelength G2 ($\neq$G1), and red light of wavelength R2 ($\neq$G1), mainly. As light sources, for example, a light source which is obtained by combining a semiconductor laser element which outputs laser beam of each wavelength and a solid-state laser element.

First display element 131*a* and second display element 131*b* of display 13*a* are configured by a liquid crystal panel, for example. In the present exemplary embodiment, first display element 131*a* outputs the first image to be reflected by first mirror 11 and second display element 131*b* outputs the second image to be reflected by beam splitter 14*a*. The first image and the second image may be light configuring the image.

Multiplexer 133 of display 13*a* is an optical element which multiplexes the first image input from first display element 131*a* and the second image input from second display element 131*b* to emit the images toward beam splitter 14*a*. Here, reflection wavelength characteristics of multiplexer 133 will be described using FIG. 6.

Figure 6:
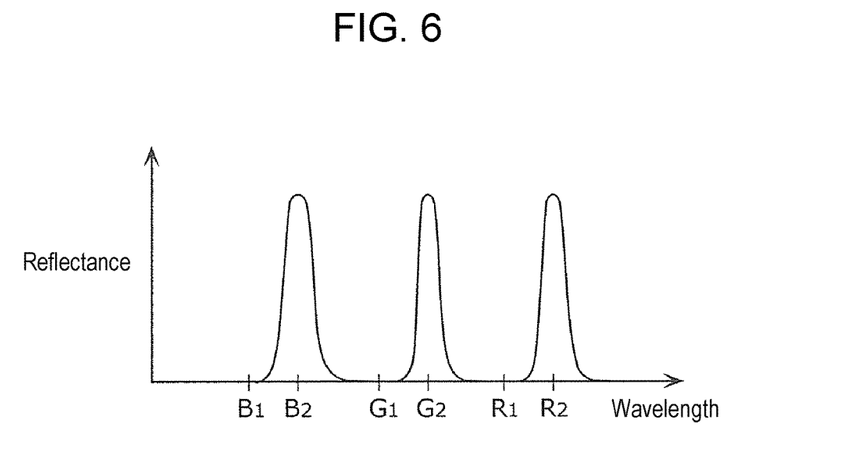
FIG. 6 is a diagram illustrating an outline of reflection wavelength characteristics of a multiplexer according to Exemplary Embodiment 2.

FIG. 6 is a diagram illustrating an outline of reflection wavelength characteristics of multiplexer 133. As illustrated in FIG. 6, multiplexer 133 has high reflectance in the wavelength band of the light output from second light source 132*b* and second display element 131*b* and has low reflectance in the wavelength band of the light output from first light source 132*a* and first display element 131*a*. Therefore, multiplexer 133 reflects only second image emitted from second display element 131*b*. In addition, in this case, multiplexer 133 deflects a travelling direction of the second image at an angle of 90 degrees. Therefore, multiplexer 133 can multiplex and output the first image and the second image. Multiplexer 133 having such characteristics can be implemented by using a hologram, for example.

Beam splitter 14a illustrated in FIG. 5 is an optical element which allows the first image among the first image and the second image emitted from multiplexer 133 to pass through thereto and the second image to reflect toward windshield glass 101. In the present exemplary embodiment, beam splitter 14a is configured by an optical element having the same reflection wavelength characteristics as that of multiplexer 133 illustrated in FIG. 6. Accordingly, as beam splitter 14a, the optical element which is the same as that of multiplexer 133 may be used, for example.

Since first mirror 11 illustrated in FIG. 5 is the same as that of projector 10 of Exemplary Embodiment 1, the description will not be described.

[2-2. Display Method of Display Device]

Figure 7:
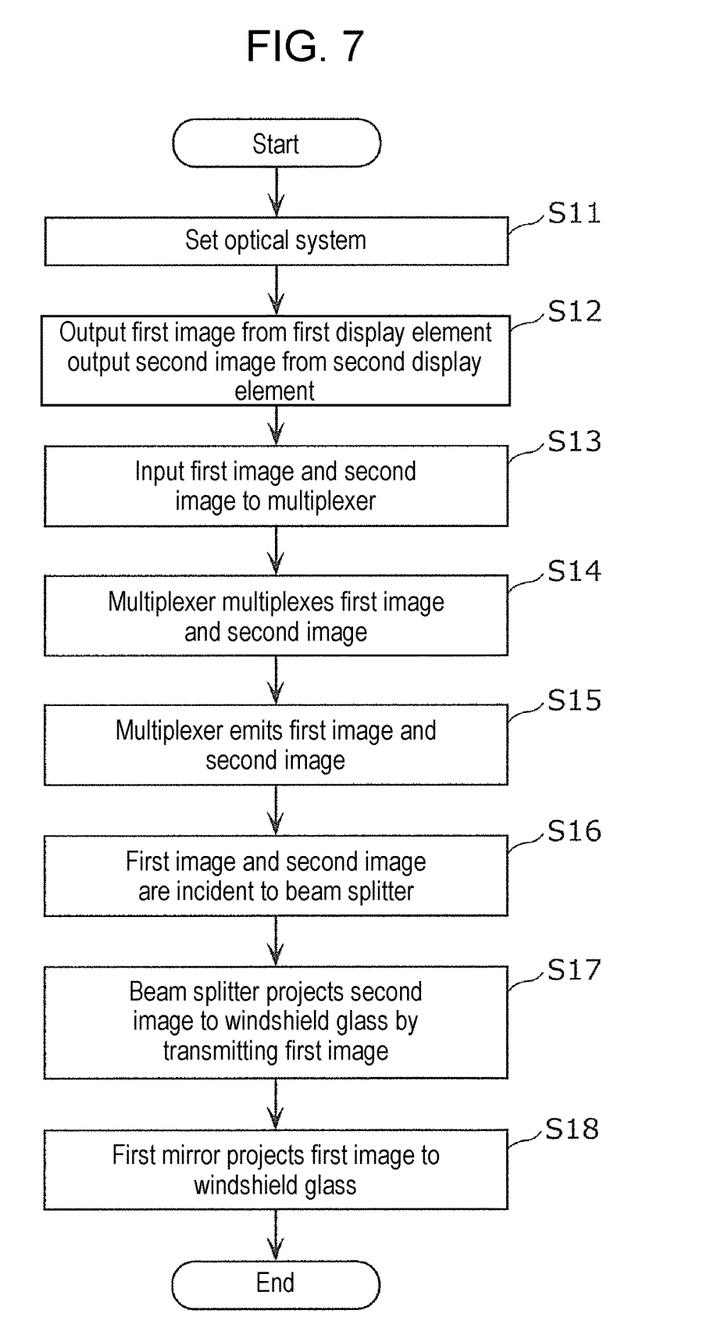
FIG. 7 is a flow chart illustrating an outline of an operation of the display device according to Exemplary Embodiment 2.

Nest, a display method in the display device according to the present exemplary embodiment described above will be described using FIG. 7. FIG. 7 is a flow chart illustrating an outline of an operation of the display device according to the present exemplary embodiment.

First, the optical system of projector 10a is set on a predetermined position (S11). Here, the optical system includes first mirror 11 and beam splitter 14a.

Next, the image information to be displayed is output from controller 20 toward display 13a. First light source 132a and second light source 132b, and first display element 131a and second display element 131b are driven based on the information and each of the first image and the second image is output from first display element 131a and second display element 131b (S12).

Next, the first image output from first display element 131a and the second image output from second display element 131b are input to multiplexer 133 (S13) and multiplexed by multiplexer 133 (S14), and then emitted toward beam splitter 14a (S15). The first image and the second image are incident to beam splitter 14a (S16).

Beam splitter 14a allows the first image to pass through thereto among the incident images and projects the second image to windshield glass 101 by reflecting the second image (S17).

The first image which has passed through beam splitter 14a is incident to first mirror 11 and projected to windshield glass 101 by being reflected by first mirror 11 (S18).

As described above, in the present exemplary embodiment, the first image and the second image emitted from display 13a are separated by beam splitter 14a, and the first image and the second image are projected on windshield glass 101 from first mirror 11 and beam splitter 14a, respectively. Accordingly, by setting the projecting region to windshield glass 101 of the first image and the second image to the different regions, the dimension of the display image to be visually recognized by user 200 in the vertical direction can be enlarged. Furthermore, in the present exemplary embodiment, since light paths of the first image and the second image are partially shared, the enlargement of the optical system can be suppressed.

Furthermore, in the present exemplary embodiment, the first image and the second image can be displayed at the same time.

In addition, in the present exemplary embodiment, the first image and the second image are mainly configured by light of three wavelength bands so as to be a color image. However, the spectrum included in each image is not limited thereto. For example, the images may be configured by the different light beams of one different wavelength band.

In addition, in the present exemplary embodiment, a configuration in which a second mirror which is used in Exemplary Embodiment 1 is not used is shown. However, the second mirror may be provided between display 13a and beam splitter 14a in the present exemplary embodiment. Therefore, a free degree of a design of an optical system is improved.

(Other Exemplary Embodiment)

As described above, as an example of the present disclosure, Exemplary Embodiments 1 and 2 are described. The present disclosure, however, shall not be limited to the embodiments; instead, the disclosure can be applied to an embodiment which is arbitrarily subject to modification, replacement, addition, and omission. Moreover, each of the constituent elements described in the exemplary embodiments may be combined to form a new embodiment.

For example, in the exemplary embodiments, a configuration, in which as the display medium with translucency for projecting the first image and the second image, windshield glass 101 is used, is shown. However, as the display medium, the configuration is not limited thereto. For example, one or more combiner can be used.

In addition, in the exemplary embodiments, the first image and the second image can be displayed by adjacent and displayed in isolation. For example, the first image adjacent to the lower end of windshield glass 101 and the second image adjacent to the upper end may be projected, respectively. Therefore, it is possible to suppress blocking a view filed in front of user 200.

In addition, in Exemplary Embodiment 2, a configuration in which the first image and the second image are formed by light beams which have different spectra to each other is shown. However, it is possible to use a configuration in which the first image and the second image are formed by the light which have different directions of polarization. In this case, as the multiplexer and the beam splitter, a polarization beam splitter can be used.

In addition, in the display device of the present disclosure, as the first image and the second image, any of a two-dimensional image and a three-dimensional image can be used, respectively.

In addition, the display device according to the exemplary embodiments may be provided in transportation equipment other than the vehicle. The transportation equipment includes aircraft, a ship, or the like.

Each of the structural elements in each of the above-described exemplary embodiments may be configured in the form of an exclusive hardware product, or may be realized by executing a software program suitable for the structural element. The constituent elements may be implemented by a program execution unit such as a CPU or a processor which reads and executes a software program recorded on a recording medium such as a hard disk or a semiconductor memory.

A display device and a display method according to one or more aspects of the present invention have been thus described on the basis of Exemplary Embodiment 1 and Exemplary Embodiment 2. Here, it should be noted that the present disclosure is not limited to the exemplary embodiments. Modifications of the embodiments which would occur to those skilled in the art are applied to the exemplary embodiments, or embodiments configured by combining constituent elements in other different embodiments, are also within the scope of the one or more aspects of the present invention, without departing from the spirit of the present invention.

For example, in the exemplary embodiments, a process to be executed by a specified processor may be executed by the other processor. In addition, a sequence of a plurality of processes may be changed and a plurality of processes may be concurrently performed.

As described above, the display device according to an aspect of the present disclosure includes a display, a beam splitter, and a first mirror. The display emits a first image and a second image. The first image and the second image emitted from the display are incident to the beam splitter. The beam splitter projects the images to a display medium by transmitting the incident first image and reflecting the incident second image. The first image which has passed through the beam splitter is incident to the first mirror. The first mirror projects the incident first image to the display medium by reflecting the incident first image.

In addition, the first image and the second image may be projected to different regions on the display medium.

In addition, a second mirror that reflects the first image and the second image emitted from the display toward the beam splitter may further be included.

In addition, the display may include a first display element that outputs the first image, a second display element that outputs the second image, and a multiplexer. The multiplexer multiplexes the first image output from the first display element and the second image output from the second display element and then emits the multiplexed images.

In addition, the first mirror may have light-converging ability.

In addition, the beam splitter may have the light-converging ability with respect to reflected light and may not have the light-converging ability with respect to transmitted light.

In addition, the first image and the second image are emitted from the display at the different timings to each other, and reflectance of the beam splitter may be switched such that the first image is transmitted and the second image is reflected.

In addition, the first image and the second image have different optical wavelength distributions to each other, and the beam splitter may include a wavelength selection mirror.

In addition, the wavelength selection mirror may include a hologram.

In addition, the first image and the second image are formed by light beams having different directions of polarization, and the beam splitter may include a polarization beam splitter.

In addition, a display method according to an aspect of the present disclosure is a display method of a display device including a display and a first mirror. A beam splitter is proved in the display device. The first image and the second image are emitted by the display and the first image and the second image emitted from the display is incident to the beam splitter. The images are projected to a display medium by transmitting the first image by the beam splitter and reflecting the second image by the beam splitter. Furthermore, the images are projected to the display medium by making the first image which has passed through the beam splitter incident to the first mirror and reflecting the incident first image to the first mirror.

It is to be noted that general or specific aspects of the above may be realized by a system, an apparatus, an integrated circuit, a computer program, or a recording medium. In addition, general or specific aspects of the above may be realized by an arbitrary combination of a system, an apparatus, an integrated circuit, a computer program, and a recording medium.

The present disclosure is useful as a head-up display.

The invention claimed is:

1. A display device comprising:
a display which projects a first image and a second image;
a beam splitter on which the first image and the second image emitted from the display are incident and which projects the second image to a display medium by transmitting the incident first image and reflecting the incident second image; and
a first mirror to which the first image which has passed through the beam splitter is incident and which projects the first image to the display medium by reflecting the incident first image,
wherein the display includes:
a first display element that outputs the first image,
a second display element that outputs the second image, and
a multiplexer that multiplexes the first image output from the first display element and the second image output from the second display element and subsequently emits the multiplexed images.

2. The display device of claim 1,
wherein the first image and the second image are projected to different regions on the display medium.

3. The display device of claim 1, further comprising:
a second mirror that reflects the first image and the second image emitted from the display, toward the beam splitter.

4. The display device of claim 1,
wherein the first mirror has light-converging ability.

5. The display device of claim 4,
wherein the beam splitter has the light-converging ability with respect to reflected light and does not have the light-converging ability with respect to transmitted light.

6. The display device of claim 1,
wherein the first image and the second image are emitted from the display at different timings to each other, and reflectance of the beam splitter is switched such that the first image is transmitted and the second image is reflected.

7. The display device of claim 1,
wherein the first image and the second image have different optical wavelength distributions to each other, and
the beam splitter includes a wavelength selection mirror.

8. The display device of claim 7,
wherein the wavelength selection mirror includes a hologram.

9. The display device of claim 1,
wherein the first image and the second image are formed by light beams having different directions of polarization, and
the beam splitter includes a polarization beam splitter.

10. A display method of a display device including a display which is provided with a beam splitter and a first mirror, the method comprising:
emitting a first image and the second image to the display;
causing the first image and the second image emitted from the display to be incident on the beam splitter;
projecting the second image to a display medium by causing the first image to pass through the beam splitter and the second image to be reflected at the beam splitter; and
projecting the first image to the display medium by causing the first image which has passed through the beam splitter to be incident on the first mirror and to be reflected at the first mirror, wherein the display is configured to:
  output the first image via a first display element,
  output the second image via a second display element, and
    multiplex, with a multiplexer, the first image output from the first display element and the second image output from the second display element and subsequent emit multiplexed images.

11. A display device comprising:

a display which projects a first image and a second image;

a beam splitter on which the first image and the second image emitted from the display are incident and which projects the second image to a display medium by transmitting the incident first image and reflecting the incident second image; and a first mirror to which the first image which has passed through the beam splitter is incident and which projects the first image to the display medium by reflecting the incident first image, wherein the first mirror has light-converging ability, and wherein the beam splitter has the light-converging ability with respect to reflected light and does not have the light-converging ability with respect to transmitted light.

* * * * *